US012776722B2

(12) United States Patent
Kim et al.

(10) Patent No.: US 12,776,722 B2
(45) Date of Patent: Oct. 27, 2026

(54) ELECTRONIC DEVICE INCLUDING RECTIFIER CIRCUIT

(71) Applicant: SAMSUNG ELECTRONICS CO., LTD., Suwon-si (KR)

(72) Inventors: Keonwoo Kim, Suwon-si (KR); Moonyoung Kim, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 783 days.

(21) Appl. No.: 18/141,796

(22) Filed: May 1, 2023

(65) Prior Publication Data

US 2024/0039422 A1 Feb. 1, 2024

Related U.S. Application Data

(63) Continuation of application No. PCT/KR2023/005381, filed on Apr. 20, 2023.

(30) Foreign Application Priority Data

Jul. 28, 2022 (KR) ........................ 10-2022-0093989

(51) Int. Cl.

| | |
|---|---|
| ***H02J 50/40*** | (2016.01) |
| ***H02J 50/10*** | (2016.01) |
| ***H02J 50/50*** | (2016.01) |
| ***H02M 7/06*** | (2006.01) |
| ***H02M 7/539*** | (2006.01) |

(52) U.S. Cl.

CPC ............... *H02M 7/06* (2013.01); *H02J 50/10* (2016.02); *H02J 50/40* (2016.02); *H02M 7/539* (2013.01)

(58) Field of Classification Search

CPC ........................................................ H02J 50/40

USPC ........................................................ 320/108

See application file for complete search history.

(56) References Cited

U.S. PATENT DOCUMENTS

| | | | |
|---|---|---|---|
| 7,136,293 | B2 | 11/2006 | Petkov et al. |
| 9,246,400 | B2 | 1/2016 | Bae |
| 9,391,535 | B2 | 7/2016 | Yeo et al. |

(Continued)

FOREIGN PATENT DOCUMENTS

| | | | |
|---|---|---|---|
| JP | 2005-278270 | A | 10/2005 |
| KR | 10-2013-0044647 | A | 5/2013 |

(Continued)

OTHER PUBLICATIONS

International Search Report (PCT/ISA/210) issued Jul. 25, 2023 by the International Searching Authority in International Application No. PCT/KR2023/005381.

(Continued)

*Primary Examiner* — Ahmed H Omar

(74) *Attorney, Agent, or Firm* — Sughrue Mion, PLLC

(57) ABSTRACT

An electronic device includes a rectifier circuit including: a first reception coil; a second reception coil; a first diode connected in a forward direction from a first end of the first reception coil and to a second end of the first reception coil; a second diode connected in a forward direction from a first end of the second reception coil and to a second end of the second reception coil; and a first capacitor, wherein an input end of the first diode is connected to an output end of the second diode through the first capacitor.

20 Claims, 12 Drawing Sheets

(56) References Cited

U.S. PATENT DOCUMENTS

| | | | | |
|---|---|---|---|---|
| 9,478,992 | B2 | 10/2016 | Hosotani | |
| 9,601,942 | B2 | 3/2017 | Bae | |
| 10,547,207 | B2 | 1/2020 | Wang et al. | |
| 2005/0226008 | A1* | 10/2005 | Harada | H02M 1/15 363/15 |
| 2016/0181825 | A1* | 6/2016 | Herrmann | H05G 1/10 307/104 |
| 2016/0308395 | A1* | 10/2016 | Jeong | H02J 50/12 |
| 2019/0131823 | A1 | 5/2019 | Ahn et al. | |
| 2021/0234534 | A1 | 7/2021 | Rochford et al. | |

FOREIGN PATENT DOCUMENTS

| | | | |
|---|---|---|---|
| KR | 10-2013-0130192 | A | 12/2013 |
| KR | 10-2014-0126368 | A | 10/2014 |
| KR | 10-1485345 | B1 | 1/2015 |
| KR | 10-2019-0048925 | A | 5/2019 |
| KR | 10-2019-0072794 | A | 6/2019 |
| KR | 10-2049840 | B1 | 11/2019 |
| KR | 10-2020-0007519 | A | 1/2020 |
| KR | 10-2302613 | B1 | 9/2021 |
| KR | 10-2022-0014786 | A | 2/2022 |

OTHER PUBLICATIONS

Written Opinion (PCT/ISA/237) issued Jul. 25, 2023 by the International Searching Authority in International Application No. PCT/KR2023/005381.

* cited by examiner

ELECTRONIC DEVICE INCLUDING RECTIFIER CIRCUIT

CROSS-REFERENCE TO RELATED APPLICATIONS

This application is a continuation application of International Application No. PCT/KR2023/005381 designating the United States, filed on Apr. 20, 2023, in the Korean Intellectual Property Receiving Office, which claims priority from Korean Patent Application No. 10-2022-0093989, filed on Jul. 28, 2022, in the Korean Intellectual Property Office, the disclosures of which are incorporated by reference herein in their entireties.

BACKGROUND

1. Field

The disclosure relates to electronic devices including a rectifier circuit.

2. Description of Related Art

Rectifiers of wireless power transmission circuits may include full-bridge rectifiers and center-tapped rectifiers. In the full-bridge rectifier, one coil may be disposed at each of a transmitting end and a receiving end. A center-tapped rectifier may require two coils at the receiving end. The two coils of the center-tapped rectifier may be spaced apart from each other by a predetermined distance in a direction of a normal vector of a plane corresponding to one of the two coils of the center tapped rectifier, or the two coils of the center-tapped rectifier may be positioned inside and outside a same plane respectively. Accordingly, in the center-tapped rectifier, coupling coefficients of reception coils and transmission coils may be different, and this difference may cause a difference in leakage inductance to occur such that losses thereof may be lopsided.

In general, full-bridge rectifiers are mainly used. Center-tapped rectifiers may be used in applications with low output voltage and high output current.

SUMMARY

One or more embodiments of the disclosure provide an electronic device including a rectifier circuit for changing a full-bridge rectifier circuit-based wireless power transmission circuit into a center-tapped rectifier circuit-based wireless power transmission circuit.

In addition, one or more embodiments of the disclosure may reduce the number of diodes required to configure the rectifier circuit, thereby saving costs.

In addition, one or more embodiments of the disclosure may effectively reduce the size of the rectifier circuit.

In addition, one or more embodiments of the disclosure may minimize the loss occurring in the rectifier circuit, allowing the rectifier circuit to be efficiently used.

Additional aspects will be set forth in part in the description which follows and, in part, will be apparent from the description, or may be learned by practice of the presented embodiments.

According to an aspect of the disclosure, an electronic device includes: a rectifier circuit including: a first reception coil; a second reception coil; a first diode connected in a forward direction from a first end of the first reception coil and to a second end of the first reception coil; a second diode connected in a forward direction from a first end of the second reception coil and to a second end of the second reception coil; and a first capacitor, wherein an input end of the first diode is connected to an output end of the second diode through the first capacitor.

The first reception coil and the second reception coil may be disposed on a first plane and spaced apart from each other by a first distance, and the first reception coil and the second reception coil may be connected in parallel.

The electronic device may further include: a first transmission coil; and a second transmission coil connected in series with the first transmission coil, and the first transmission coil may be coupled to the first reception coil, and the second transmission coil may be coupled to the second reception coil.

The first transmission coil and the second transmission coil may be disposed on a second plane, and the first transmission coil and the second transmission coil may be spaced apart by a second distance.

Each of the first reception coil and the second reception coil may be circular.

The rectifier circuit may further include: a third reception coil; and a fourth reception coil, the third reception coil and the fourth reception coil may be disposed on the first plane, the third reception coil may be spaced apart from the first reception coil by a third distance, the fourth reception coil may be spaced apart from the second reception coil by the third distance, and the first reception coil, the second reception coil, the third reception coil, and the fourth reception coil may be connected in parallel.

The rectifier circuit may further include: a second capacitor; a third diode connected in a forward direction from a first end of the third reception coil and to a second end of the third reception coil; and a fourth diode connected in a forward direction from a first end of the fourth reception coil and to a second end of the fourth reception coil, and an input end of the third diode may be connected to an output end of the fourth diode through the second capacitor.

The electronic device may further include: a third transmission coil; and a fourth transmission coil connected in series with the third transmission coil, the third transmission coil may be coupled to the third reception coil, and the fourth transmission coil may be coupled to the fourth reception coil.

The third transmission coil and the fourth transmission coil may be disposed on the second plane, the third transmission coil may be spaced apart from the first transmission coil by a fourth distance, the fourth transmission coil may be spaced apart from the second transmission coil by the fourth distance, and the first transmission coil, the second transmission coil, the third transmission coil, and the fourth transmission coil may be connected in series.

The electronic device may further include a battery, and the rectifier circuit may be connected to the battery.

The first transmission coil may be connected to an external power source configured to supply power to the electronic device.

The electronic device may further include: a third capacitor connected to the first transmission coil; and a first switch and a second switch connected in parallel to the third capacitor and the first reception coil.

The first plane may be spaced apart from the second plane by a fifth distance, and the first plane may be disposed in parallel to the second plane.

The first reception coil may be disposed in parallel to the second reception coil, and the first reception coil and the second reception coil are disposed on different planes, respectively.

The second reception coil may be arranged in a center area of the first reception coil, and the first reception coil and the second reception coil are arranged on a first plane.

The first reception coil and the second reception coil may have a same number of turns.

Each of the first transmission coil and the second transmission coil may be circular.

The electronic device may further include a single transmission coil coupled with each of the first reception coil and the second reception coil.

Effects of the present invention are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same or similar reference denotations may be used to refer to the same or similar elements throughout the specification and the drawings.

DETAILED DESCRIPTION

Figure 1:
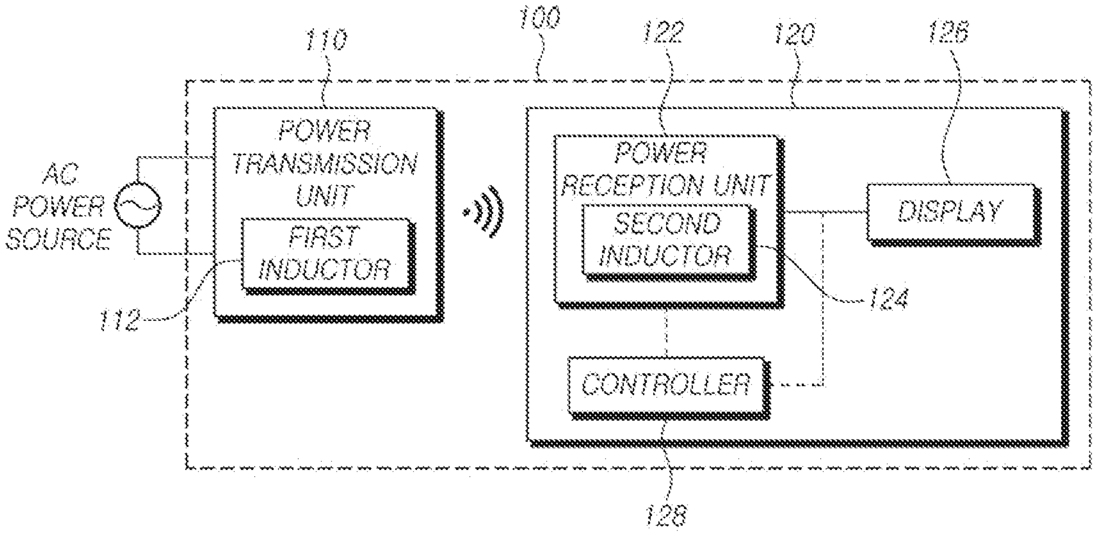
FIG. 1 is a block diagram illustrating a configuration of an electronic device according to an embodiment.

Embodiments of the present disclosure are described below with reference to the accompanying drawings in such a detailed manner as to be practiced by one of ordinary skill in the art. However, the present disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a block diagram illustrating a configuration of an electronic device according to an embodiment. The electronic device of FIG. 1 may be, but is not limited to, a smartphone, a tablet personal computer (PC), a PC, a smart television (TV), a mobile phone, a personal digital assistant (PDA), a laptop computer, a media player, a micro server, a digital broadcast terminal, a navigation, a kiosk, a home appliance, or other mobile or non-mobile computing devices. The electronic device 100 may be any of wearable terminals, such as watches and glasses, capable of performing various computing functions, such as video display and communication. The electronic device 100 may be any of various types of terminals without being limited to the above examples.

According to an embodiment, the electronic device 100 may include a power transmission unit 110 and a receiving end 120. The power transmission unit 110 may be referred to as a "transmitting end."

The power transmission unit 110 according to an embodiment may receive power from an external alternating current (AC) power source and supply power to the receiving end 120.

The power transmission unit 110 according to an embodiment may include a first inductor 112.

In an embodiment, the first inductor 112 may receive current from the AC power source and supply power to the receiving end 120.

The receiving end 120 according to an embodiment may include a power reception unit 122, a second inductor 124 included in the power reception unit 122, a display 126, and a controller 128.

In an embodiment, the power reception unit 122 may receive power transmitted through the power transmission unit 110.

In an embodiment, the second inductor 124 may receive the power generated from the first inductor 112. In the following description, the first inductor 112 may be referred to as a "transmission coil," and the second inductor 124 may be referred to as a "reception coil."

Although FIG. 1 illustrates that the electronic device 100 includes the power transmission unit 110 (which may be referred to as a "transmitting end") and the receiving end 120, the power transmission unit 110 and the receiving end 120 each may be included in respective ones of separate devices. In other words, the electronic device 100 may include only one of the power transmission unit 110 and the receiving end 120.

In an embodiment, the display 126 may perform functions for outputting information in the form of numbers, characters, images, and/or graphics. The display 126 may include at least one hardware module for providing an output of the display 126. The at least one hardware module may include at least one of, e.g., a liquid crystal display (LCD), a light emitting diode (LED), a light emitting polymer display (LPD), an organic light emitting diode (OLED), an active matrix organic light emitting diode (AMOLED), or flexible LED (FLED). The display 126 may display a screen corresponding to data received from a processor. The display 126 may be referred to as an 'output unit', a 'display unit', or by other terms having an equivalent technical meaning.

According to an embodiment, the at least one processor may execute at least one command stored in the memory to execute data processing or computation regarding communication and/or control of at least one other component of the electronic device 100. The at least one processor may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

Figure 2:
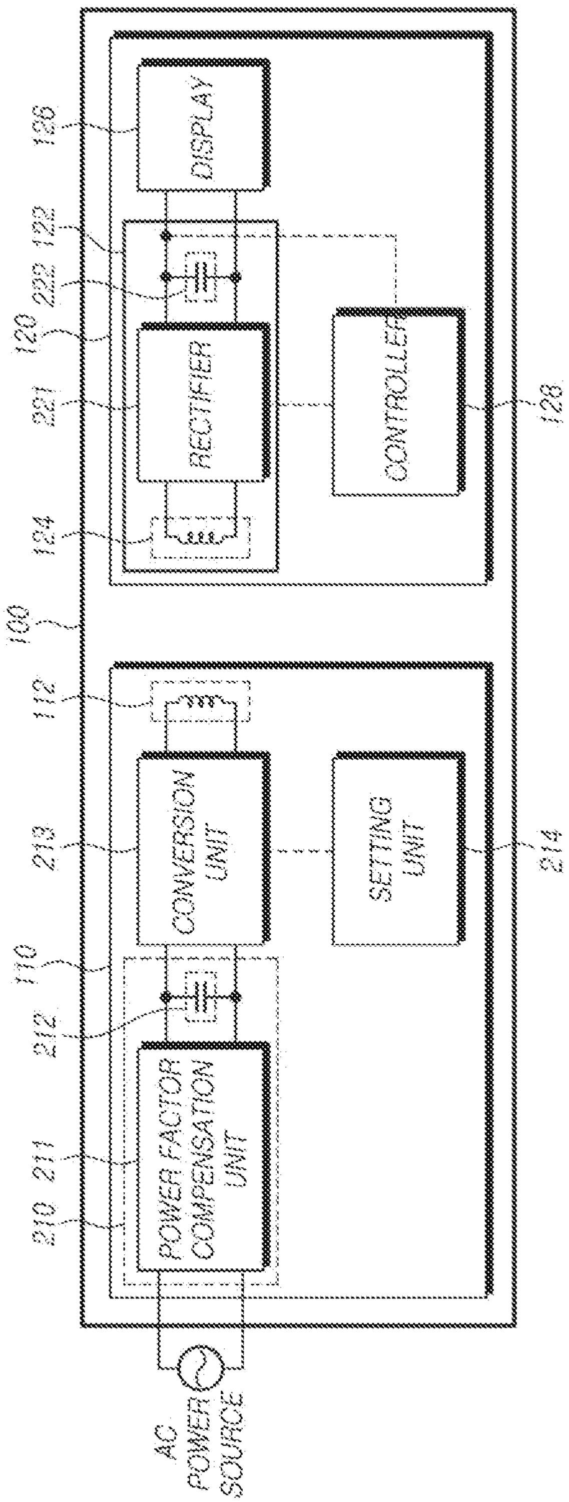
FIG. 2 is a block diagram illustrating a detailed configuration of an electronic device 100 according to an embodiment.

FIG. 2 is a block diagram illustrating a detailed configuration of an electronic device 100 according to an embodiment. The same part as that described in connection with FIG. 1 or obvious parts may be omitted from the description of FIG. 2, and the same components may be denoted with the same reference numbers.

Referring to FIG. 2, an electronic device 100 according to an embodiment may include a transmitting end 110 and a receiving end 120.

The transmitting end 110 according to an embodiment may include an input unit 210 receiving AC power, a conversion unit 213 converting input commercial power into a high-frequency power signal capable of wireless power transmission, and a setting unit 214 setting an operating frequency to allow the first inductor 112 to operate at a preset frequency corresponding to a resonant frequency.

In an embodiment, the input unit 210 may include a power factor compensation unit 211 adjusting the power factor (PF) of the AC power and converting the AC power into direct current (DC) power and a capacitor 212 capable of storing the power output from the power factor compensation unit 211. In an embodiment, the power factor compensation unit 211 may include a noise filter removing noise components of the input AC power.

In an embodiment, the conversion unit 213 may convert the DC power output from the input unit 210 into AC power and apply the converted AC power to the first inductor 112. The conversion unit 213 may be implemented as an inverter circuit including a plurality of switching elements and may apply AC power to the first inductor 112 in response to a switching operation.

In an embodiment, the conversion unit 213 may be operated under open loop control by a preset frequency (which may be referred to as an "operating frequency"), allowing the first inductor 112 and the second inductor 124 to resonate, so that power is transferred from the first inductor 112 and to the second inductor 124.

The receiving end 120 according to an embodiment may include a power reception unit 122, a display 126, a controller 128, a second inductor 124, a rectifier 221 rectifying the current of the second inductor 124, and a capacitor 222 smoothing the voltage through the rectifier 221.

In the following description, "rectifier circuit" may mean a circuit including of all or some of a rectifier (e.g., the rectifier 221), the second inductor 124, the capacitor 222, the first inductor 112, and the conversion unit 213.

Figure 3A:
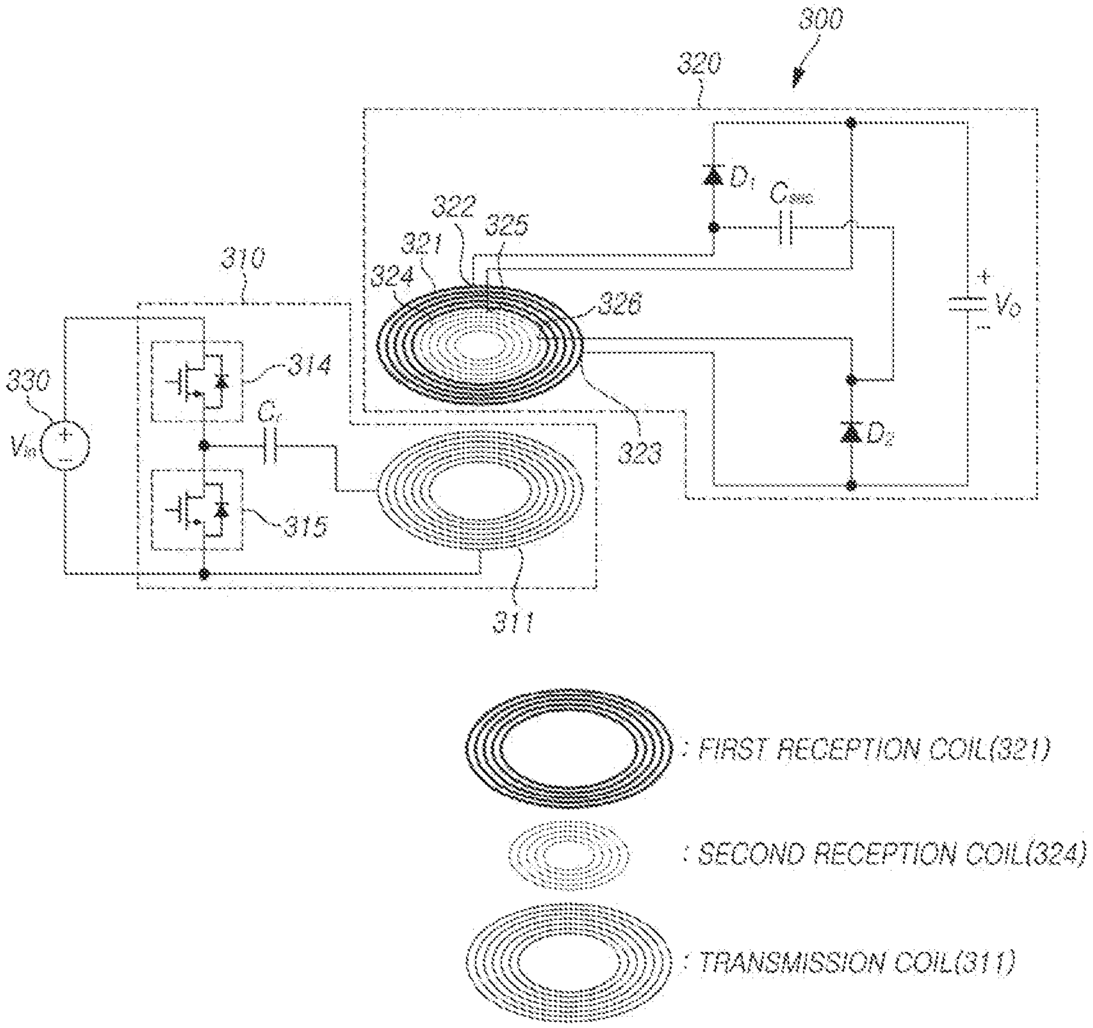
FIG. 3A illustrates an example rectifier circuit included in an electronic device according to an embodiment.
Figure 3B:
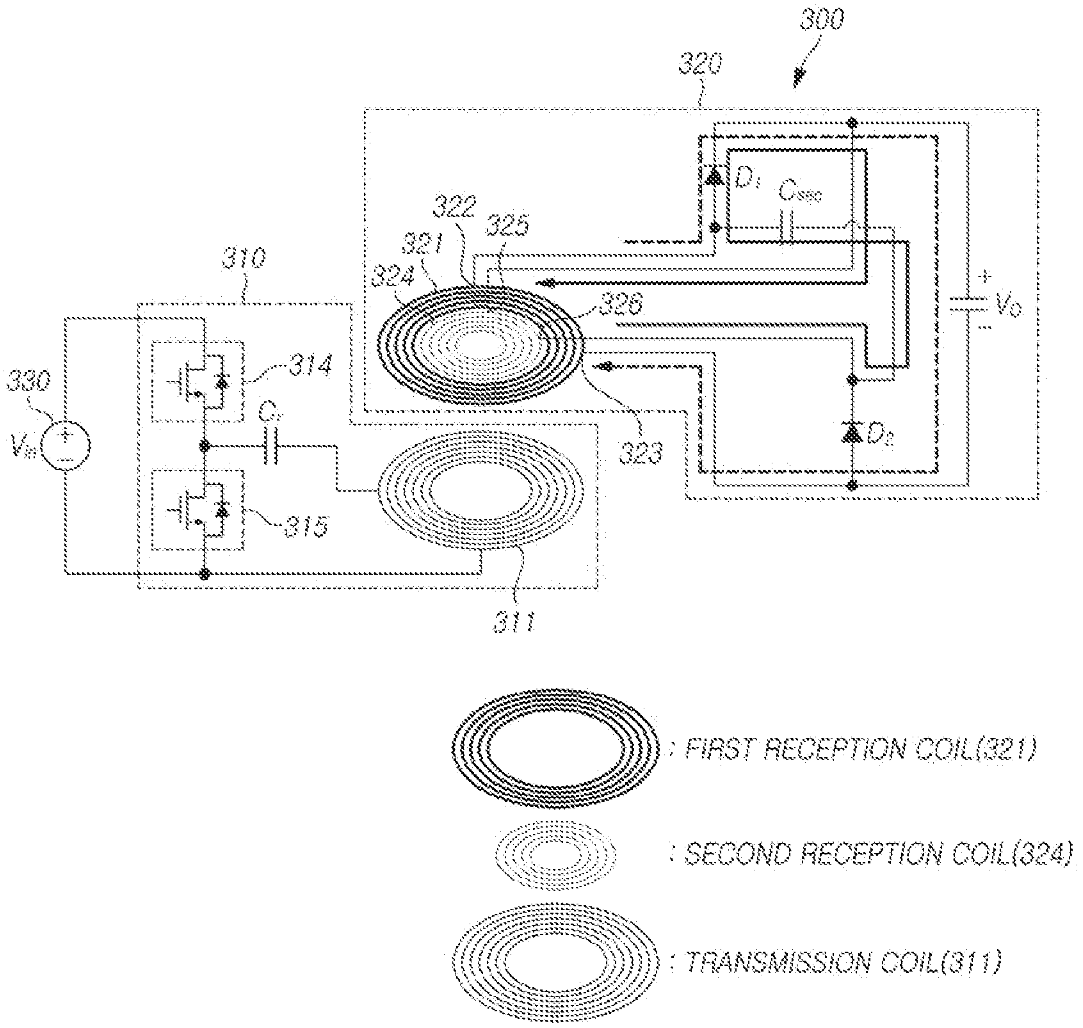
FIG. 3B illustrates an example rectifier circuit included in an electronic device according to an embodiment.
Figure 3C:
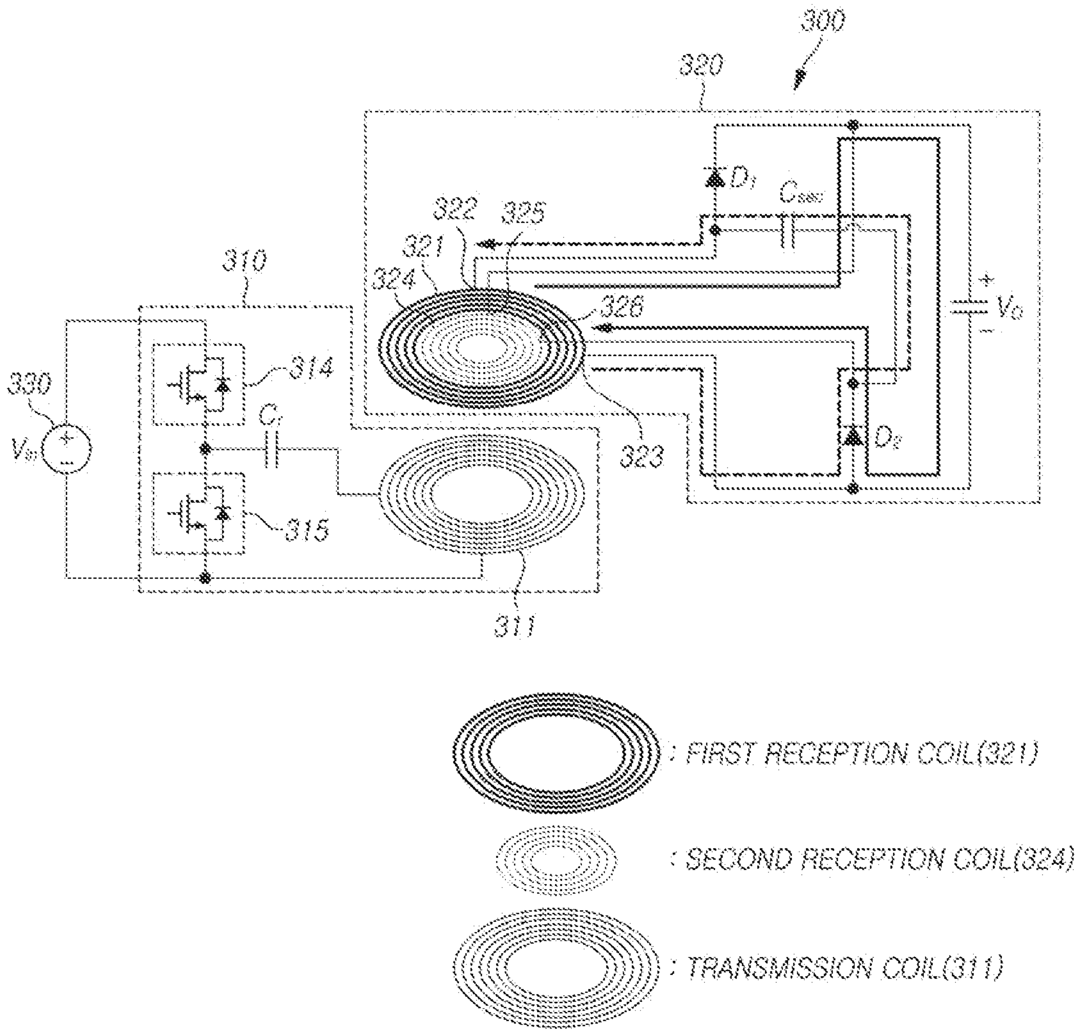
FIG. 3C illustrates an example rectifier circuit included in an electronic device according to an embodiment.

FIG. 3A illustrates an example rectifier circuit 300 included in an electronic device 100 according to an embodiment. FIG. 3B illustrates an example rectifier circuit 300 included in an electronic device 100 according to an embodiment. FIG. 3C illustrates an example rectifier circuit 300 included in an electronic device 100 according to an embodiment. FIG. 3A, FIG. 3B, and FIG. 3C may have the same circuit configuration. FIG. 3A illustrates the circuit configuration alone, and FIG. 3B and FIG. 3C illustrate a signal flow (positive period and negative period) along with the circuit configuration. The same parts as those described in connection with FIG. 1 and FIG. 2 and obvious parts may be omitted from the description of FIG. 3A, FIG. 3B, and FIG. 3C.

Referring to FIG. 3A, a rectifier circuit 300 according to an embodiment may include a transmitting end 310 and a receiving end 320. The configuration of the rectifier circuit 300 illustrated in FIG. 3A, FIG. 3B, and FIG. 3C is merely an example, and such a structure is possible in which a transmission coil, two reception coils, two diodes, and one compensation capacitor are expanded in a set such as described further below in detail with reference to FIG. 6 and FIG. 7.

Referring to FIG. 3A, the transmitting end 310 according to an embodiment may include a transmission coil 311, a plurality of switching elements 314 and 315, and a capacitor $C_r$.

In an embodiment, the transmission coil 311 may receive power from an external power source 330 and transfer the power to the reception coil (e.g., first reception coil 321 or second reception coil 324).

In an embodiment, the plurality of switching elements (e.g., switch 314 and switch 315) may be sequentially controlled, so that the direction of the current entering the transmission coil 311 may be varied.

In an embodiment, the capacitor $C_r$ may be disposed between the plurality of switching elements (e.g., switch 314 and switch 315) and the transmission coil 311.

The receiving end 320 according to an embodiment may include a first reception coil 321, a second reception coil 324, a first diode $D_1$, a second diode $D_2$, and a compensation capacitor $C_{sec}$.

In an embodiment, the second reception coil 324 may be disposed inside the first reception coil 321.

In an embodiment, the first reception coil 321 and the second reception coil 324 may be connected in parallel with the first diode $D_1$ and the second diode $D_2$.

In an embodiment, the first diode $D_1$ may be connected in a forward direction between one end 322 of the first reception coil 321 and another end 323 of the first reception coil 321. For example, one end 322 of the first reception coil 321 may be connected with the input end of the first diode $D_1$, and the other end 323 of the first reception coil 321 may be connected with the output end of the first diode $D_1$.

In an embodiment, the second diode $D_2$ may be connected in a forward direction between one end 325 and another end 326 of the second reception coil 324. For example, one end 325 of the second reception coil 324 may be connected with the input end of the second diode $D_2$, and the other end 326 of the second reception coil 324 may be connected with the output end of the second diode $D_2$.

In an embodiment, the power transferred through the transmitting end 310 may be output to have a voltage of $V_0$ at the receiving end 320.

Referring to FIG. 3B and FIG. 3C, current may flow to the first diode $D_1$ and the second diode $D_2$ according to the switching operation of the plurality of switching elements (e.g., switch 314 and switch 315) of the transmitting end 310 according to an embodiment.

Referring to FIG. 3B, in an embodiment, when powering is performed through the first diode $D_1$ according to the switching operation of the plurality of switching elements (e.g., switch 314 and switch 315) of the transmitting end 310, current may flow from one end 322 of the first reception coil 321 through the first diode $D_1$ and to the other end 323 of the first reception coil 321. Further, current may flow from the other end 326 of the second reception coil 324 through the first diode $D_1$ and to the one end 325 of the second reception coil 324.

Referring to FIG. 3C, in an embodiment, when powering is performed through $D_2$ according to the switching operation of the plurality of switching elements (e.g., switch 314 and switch 315) of the transmitting end 310, current may flow from the other end 322 of the first reception coil 321 through the second diode $D_2$ to the one end 322 of the first reception coil 321. Further, current may flow from the one end 325 of the second reception coil 324 to the other end 326 of the second reception coil 324.

The capacitor $C_{sec}$ according to an embodiment may be disposed between the input end of the first diode $D_1$ and the output end of the second diode $D_2$ to connect the first diode $D_1$ and the second diode $D_2$. The first reception coil 321 and the second reception coil 324 may be positioned inside or outside of each other as shown in FIG. 3A, FIG. 3B, and FIG. 3C or the first reception coil 321 and the second reception coil 324 may be disposed to overlap each other, such that the coupling coefficients with the transmission coil 311 may differ. For example, since the second reception coil 324 may be positioned more inside than the first reception coil 321, its a coupling coefficient with the transmission coil 311 may be higher. Accordingly, the second reception coil 324 may have less leakage inductance than the first reception coil 321, so that more power may be transferred to the second diode $D_2$ connected with the second reception coil 324. Thus, the magnitudes of the currents flowing to the first diode $D_1$ and the second diode $D_2$ may differ, so that the loss may be lopsided, causing current to flow only to one rectifier diode. Even when powering is performed through diode $D_1$ through the capacitor $C_{sec}$ according to an embodiment, current may flow through diode $D_2$ and, even when powering is performed through diode $D_2$, current may flow through diode $D_1$, minimizing leakage inductance.

Although not shown in the drawings, the shapes of the transmission coil and the reception coil according to an embodiment may be circular. The shapes of the transmission coil and the reception coil according to an embodiment may be polygonal (e.g., rectangular or oval).

Figure 4:
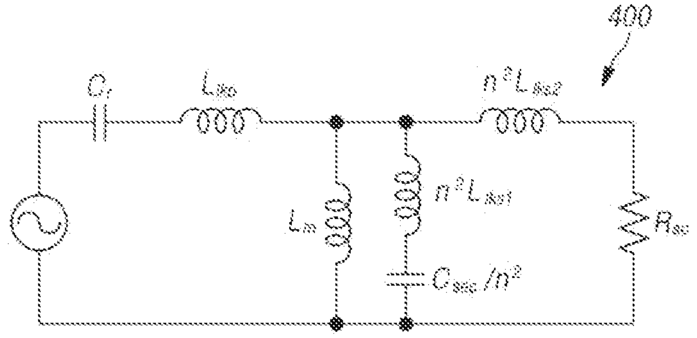
FIG. 4 illustrates a rectifier circuit according to an embodiment.
Figure 5:
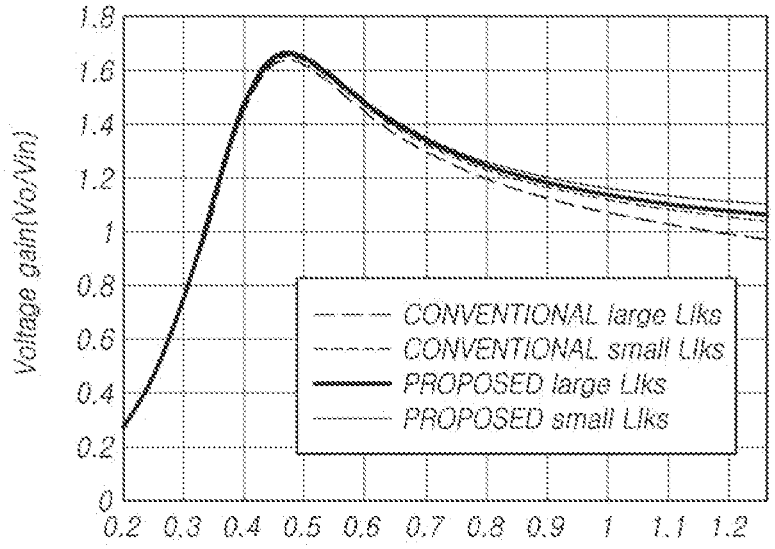
FIG. 5 illustrates a voltage gain graph according to an embodiment.

FIG. 4 illustrates an example 400 of a rectifier circuit according to an embodiment. FIG. 5 illustrates a voltage gain graph according to an embodiment. The circuit illustrated in FIG. 4 represents an equivalent circuit of FIG. 3A. Referring to FIG. 4, when the reception coils on the second side are denoted as $L_{lks1}$ and $L_{lks2}$, an AC equivalent circuit as illustrated in FIG. 4 may be implemented.

Referring to FIG. 5, assuming that the voltage to the capacitor $C_{sec}$ is a constant voltage in FIG. 4, a voltage gain graph as illustrated in FIG. 5 may be shown. Referring to FIG. 5, in the conventional rectifier structure (no capacitor is disposed between the diodes in the receiving end), it may be identified that when a leakage inductance difference occurs, the voltage gain graphs are spread, but, in the configuration of FIG. 3A and FIG. 4, although a leakage inductance may occur between reception coils, the voltage gain graphs are not significantly spread despite a difference in leakage inductance between the reception coils. Accordingly, the currents flowing to the first diode $D_1$ and the second diode $D_2$ may be similar. Resultantly, a rectifier circuit according to the disclosure may configure a circuit capable of transferring the same power through the reception coil even though a center-tapped rectifier in which leakage inductance differs between the reception coils may be used.

Figure 6:
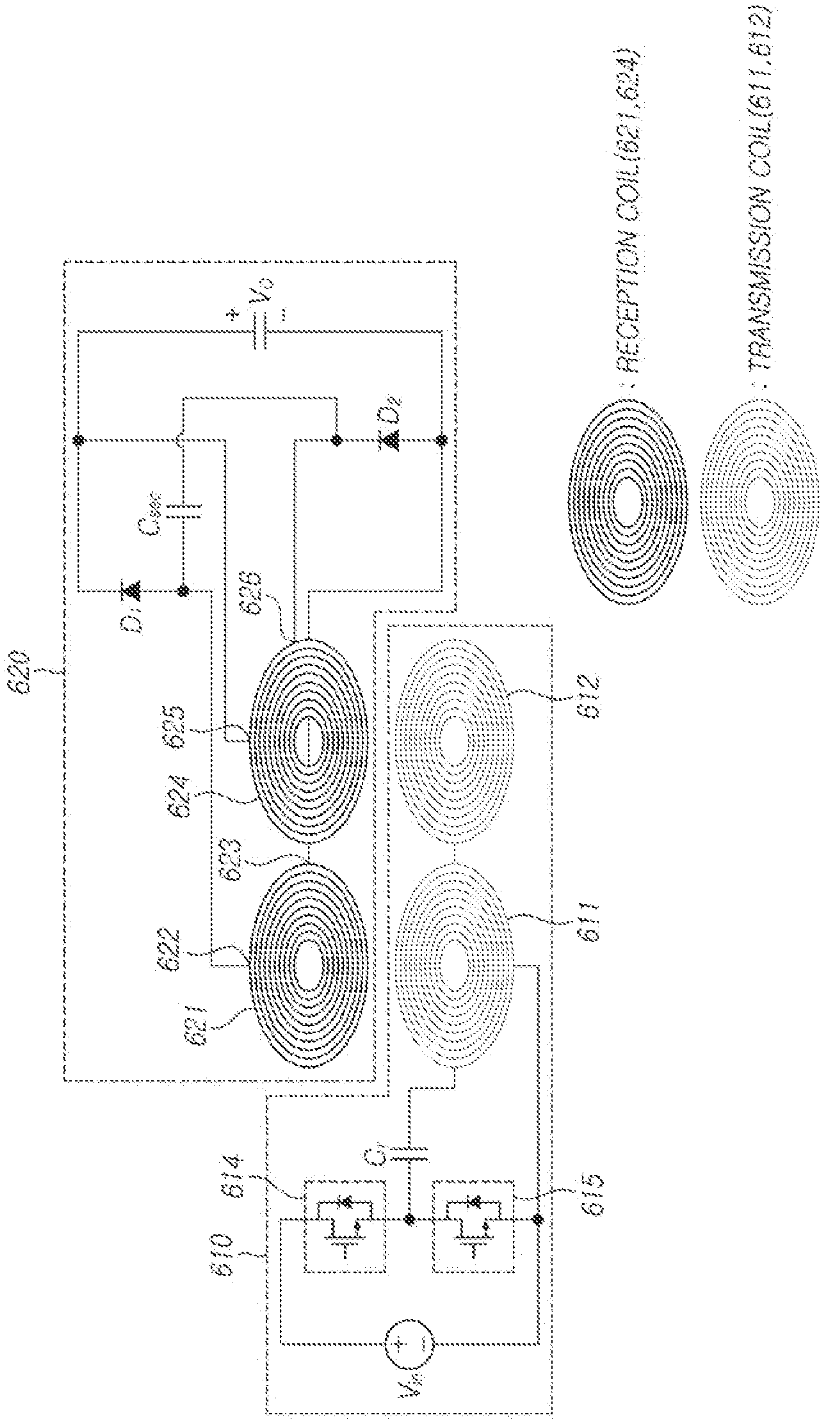
FIG. 6 illustrates an example rectifier circuit according to an embodiment.

FIG. 6 illustrates an example rectifier circuit according to an embodiment. In the description of FIG. 6, parts described in connection with FIG. 1, FIG. 2, and FIG. 3A may be omitted.

Referring to FIG. 6, a rectifier circuit according to an embodiment may include a transmitting end 610 and a receiving end 620.

The transmitting end 610 according to an embodiment may include a first transmission coil 611, a second transmission coil 612, a plurality of switching elements 614 and 615, and a capacitor $C_r$.

In an embodiment, the first transmission coil 611 and the second transmission coil 612 may receive power from an external power source and transfer the power to the reception coil (e.g., first reception coil 621 or second reception coil 624).

In an embodiment, the first transmission coil 611 and the second transmission coil 612 may be spaced apart from each other by a predetermined distance and disposed on the same plane.

In an embodiment, the first transmission coil 611 and the second transmission coil 612 may be connected in series.

In general, to configure an application with a low output voltage, a large number of turns is required for the coil of the transmitting end. To increase the number of coil turns, the coil may be divided into an upper part and a lower part which are then connected to each other, or the diameter of the transmission coil may be increased. Such a method may result in an increase in the area (height or radius) necessary for placing the coil due to the increase in the number of turns. Since more turns are allowed for the plurality of reception coils spaced apart from each other by a predetermined distance and disposed on the same plane as illustrated in FIG. 6 than for the reception coils formed inside and outside as illustrated in FIG. 3A, FIG. 3B, and FIG. 3C, the efficiency of the rectifier circuit may be increased.

In an embodiment, the plurality of switching elements (e.g., switch 614 and switch 615) may be sequentially controlled, so that the direction of the current entering the first transmission coil 611 may be varied.

In an embodiment, the capacitor $C_r$ may be disposed between the plurality of switching elements (e.g., switch 614 and switch 615) and the first transmission coil 611.

The receiving end 620 according to an embodiment may include a first reception coil 621, a second reception coil 624, a first diode $D_1$, a second diode $D_2$, and a compensation capacitor $C_{sec}$.

In an embodiment, the first reception coil 621 and the second reception coil 624 may be connected in parallel with the first diode $D_1$ and the second diode $D_2$.

In an embodiment, the first diode $D_1$ may be connected in a forward direction between one end 622 and the other end 623 of the first reception coil 621. For example, one end 622 of the first reception coil 621 may be connected with the input end of the first diode $D_1$, and the other end 623 of the first reception coil 621 may be connected with the output end of the first diode $D_1$.

In an embodiment, the second diode $D_2$ may be connected in a forward direction between one end 625 and the other end 626 of the second reception coil 624. For example, one end 625 of the second reception coil 624 may be connected with the input end of the second diode $D_2$, and the other end 626 of the second reception coil 624 may be connected with the output end of the second diode $D_2$.

In an embodiment, the power transferred through the transmitting end 610 may be output to have a voltage of $V_0$ at the receiving end.

The capacitor $C_{sec}$ according to an embodiment may be disposed between the input end of the first diode $D_1$ and the output end of the second diode $D_2$ to connect the first diode $D_1$ and the second diode $D_2$.

In an embodiment, the first reception coil 621 and the second reception coil 624 may be spaced apart from each other by a predetermined distance and disposed on the same plane. The first reception coil 621 and the second reception coil 624 may be disposed not to overlap each other but to instead be spaced apart from each other by a predetermined distance, rather than positioned inside and outside like the reception coils 321 and 324 as illustrated in FIG. 3A, FIG. 3B, and FIG. 3C.

In an embodiment, the first reception coil 621 may be coupled with the first transmission coil 611, and the second reception coil 624 may be coupled with the second transmission coil 612. "Coupling" may mean that, of a pair of a transmission coil and a reception coil, the transmission coil and the reception coil are disposed in adjacent positions to be able to give and receive power therebetween.

As the transmission coils, the first transmission coil 611 and the second transmission coil 612, and the reception coils, the first reception coil 621 and the second reception coil 624, are spaced apart from each other and disposed on the same plane to be coupled to each other, the difference in leakage inductance may be minimized. Further, according to the switching operation of the plurality of switching elements 614 and 615 of the transmitting end 610 through the rectifier circuit as illustrated in FIG. 6, power may be alternately transferred from the first transmission coil 611 to the first reception coil 621 for a half period, and from the second transmission coil 612 to the second reception coil 624 for the other half period. Further, nearly similar coupling coefficients may be formed between the transmission coils, the first transmission coil 611 and the second transmission coil 612, and the reception coils, the first reception coil 621 and the second reception coil 624, so that nearly similar leakage inductances may be generated at the first reception coil 621 and the second reception coil 624, and, although there may be a difference, the current may be balanced by the capacitor $C_{sec}$ to make the currents flowing to the first diode $D_1$ and the second diode $D_2$ more similar to each other.

Figure 7:
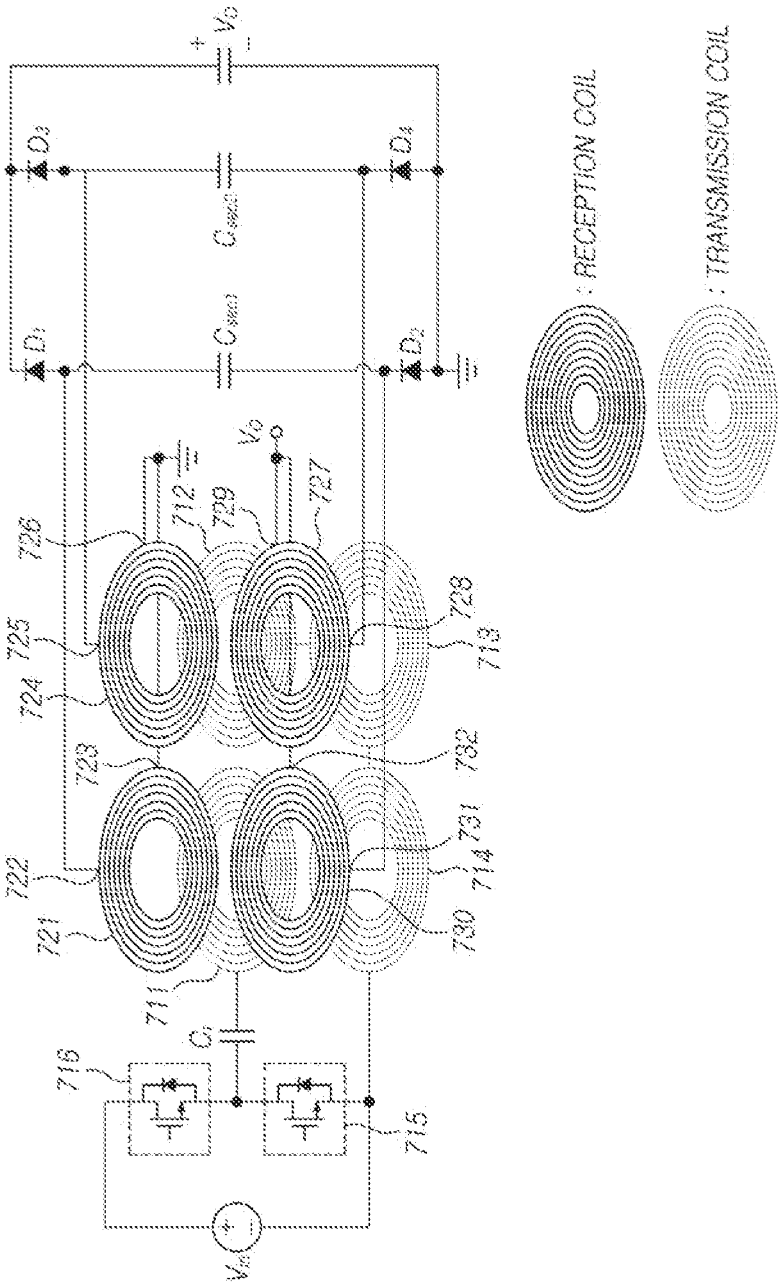
FIG. 7 illustrates an example rectifier circuit according to an embodiment.

FIG. 7 illustrates an example rectifier circuit according to an embodiment. In the description of FIG. 7, parts described in connection with FIG. 1, FIG. 2, FIG. 3A, and FIG. 6 may be omitted.

Referring to FIG. 7, a rectifier circuit according to an embodiment may include a transmitting end and a receiving end. As shown broken lines in FIG. 3A, FIG. 3B, and FIG. 6, an electronic device according to an embodiment referring to FIG. 7 may also include a transmitting end, including transmission coils and a plurality of switching elements, and a receiving end including reception coils, diodes, and capacitors.

The transmitting end according to an embodiment may include a first transmission coil 711, a second transmission coil 712, a third transmission coil 713, a fourth transmission coil 714, a plurality of switching elements 715 and 716, and a capacitor $C_r$.

In an embodiment, the first transmission coil 711, the second transmission coil 712, the third transmission coil 713, and the fourth transmission coil 714 may receive power from an external power source and transfer the power to the reception coil (e.g., first reception coil 721, second reception coil 724, third reception coil 727, or fourth reception coil 730).

In an embodiment, the first transmission coil 711, the second transmission coil 712, the third transmission coil 713, and the fourth transmission coil 714 may be spaced apart from each other by a predetermined distance and disposed on the same plane. For example, as illustrated in FIG. 7, two transmission coils, first transmission coil 711 and second transmission coil 712, horizontally and two transmission coils, third transmission coil 713 and fourth transmission coil 714, vertically may be spaced from each other and disposed on a same plane.

In an embodiment, the first transmission coil 711, the second transmission coil 712, the third transmission coil 713, and the fourth transmission coil 714 may be connected in series.

As illustrated in FIG. 7, two more transmission coils, third transmission coil 713 and fourth transmission coil 714, may be disposed on the same plane as the two transmission coils, first transmission coil 711 and second transmission coil 712, and spaced apart therefrom by a predetermined distance to have a square shape, allowing more power to be supplied.

In an embodiment, the plurality of switching elements (e.g., switch 714 and switch 715) may be sequentially controlled, so that the direction of the current entering the first transmission coil 711, second transmission coil 712, third transmission coil 713, and fourth transmission coil 714 may be varied.

In an embodiment, the capacitor $C_r$ may be disposed between the plurality of switching elements (e.g., switch 714 and switch 715) and the first transmission coil 711.

The receiving end according to an embodiment may include a first reception coil 721, a second reception coil 724, a third reception coil 727, a fourth reception coil 730, a first diode $D_1$, a second diode $D_2$, a third diode $D_3$, a fourth diode $D_4$, and a compensation capacitor $C_{sec1}$ a compensation capacitor $C_{sec2}$.

In an embodiment, the first reception coil 721, the second reception coil 724, the third reception coil 727, and the fourth reception coil 730 may be connected in parallel with the first diode $D_1$, the second diode $D_2$, the third diode $D_3$, and the fourth diode $D_4$.

In an embodiment, the first reception coil 721, the second reception coil 724, the third reception coil 727, and the fourth reception coil 730 may be spaced apart from each other by a predetermined distance and disposed on the same plane. For example, as illustrated in FIG. 7, two reception coils, the first reception coil 721 and the second reception coil 724, horizontally and two reception coils, the third reception coil 727 and the fourth reception coil 730, vertically may be spaced from each other and disposed on the same plane.

As illustrated in FIG. 7, transmission coils and reception coils may be added by an even number, and whenever two transmission coils and two reception coils are added, one capacitor and two diodes may be added to the receiving end and, in such a manner, the circuit may be expanded and configured.

The capacitor $C_{sec1}$ according to an embodiment may be disposed between the input end of the first diode $D_1$ and the output end of the second diode $D_2$ to connect the first diode $D_1$ and the second diode $D_2$. The capacitor $C_{sec2}$ according to an embodiment may be disposed between the input end of the third diode $D_3$ and the output end of the fourth diode $D_4$ to connect the third diode $D_1$ and the fourth diode $D_2$.

In an embodiment, the first reception coil 721 may be coupled with the first transmission coil 711, and the second reception coil 724 may be coupled with the second transmission coil 712. "Coupling" may mean that, of a pair of a transmission coil and a reception coil, the transmission coil and the reception coil are disposed in adjacent positions to be able to give and receive power therebetween.

As the transmission coils and the reception coils are spaced apart from each other and disposed on the same plane to be coupled to each other, the difference in leakage inductance may be minimized.

Figure 8:
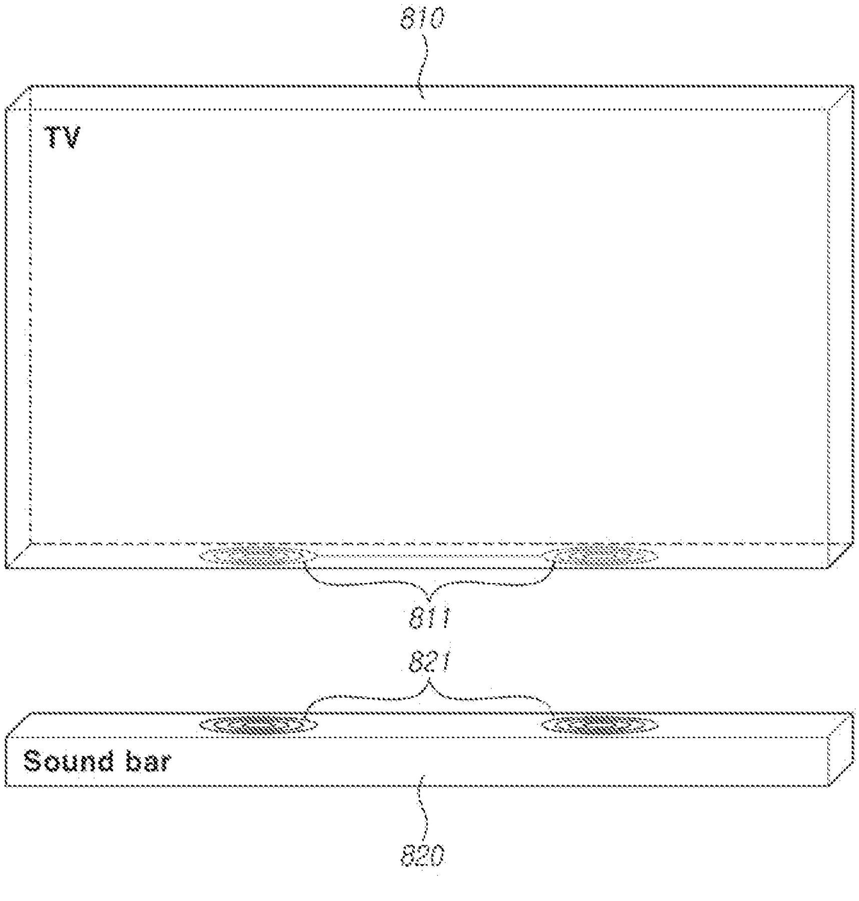
FIG. 8 illustrates an example electronic device including a rectifier circuit according to an embodiment.
Figure 9:
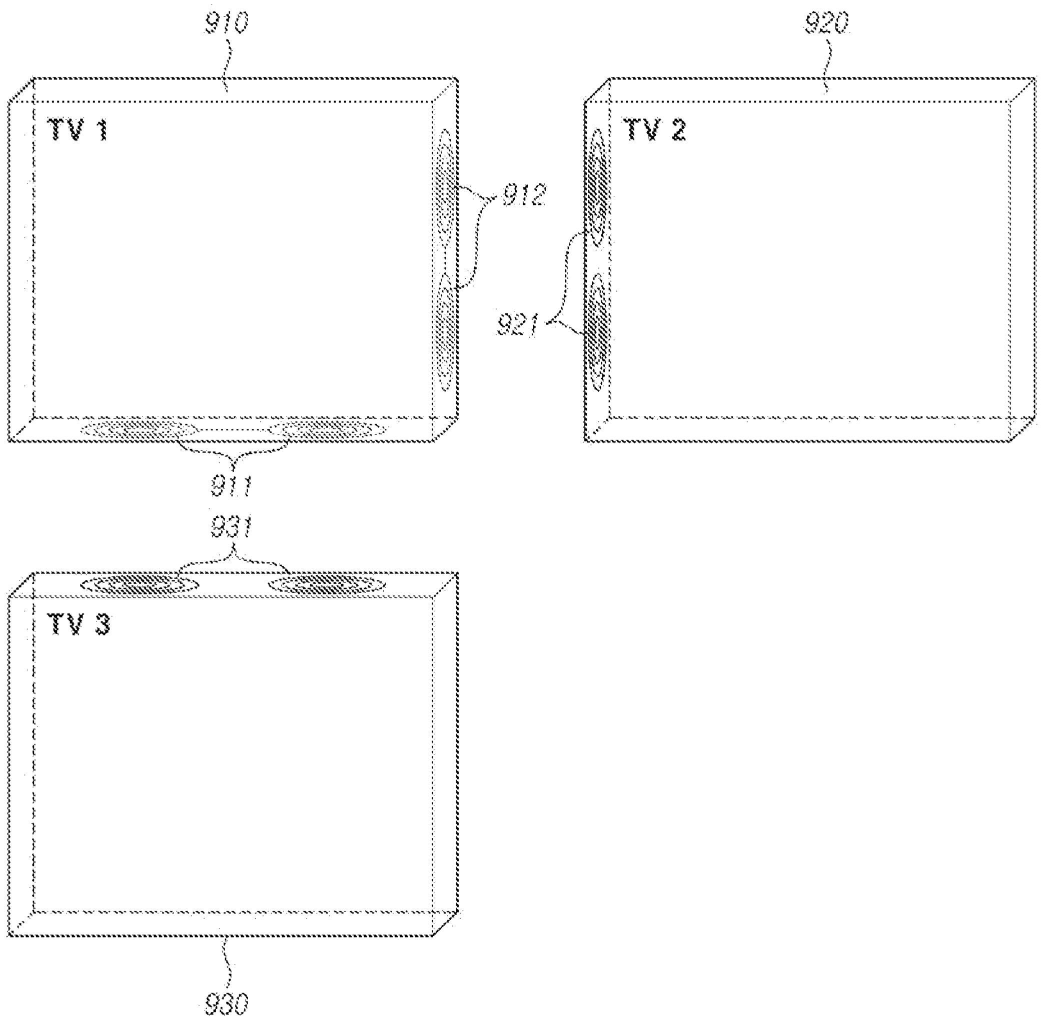
FIG. 9 illustrates an example electronic device including a rectifier circuit according to an embodiment.
Figure 10:
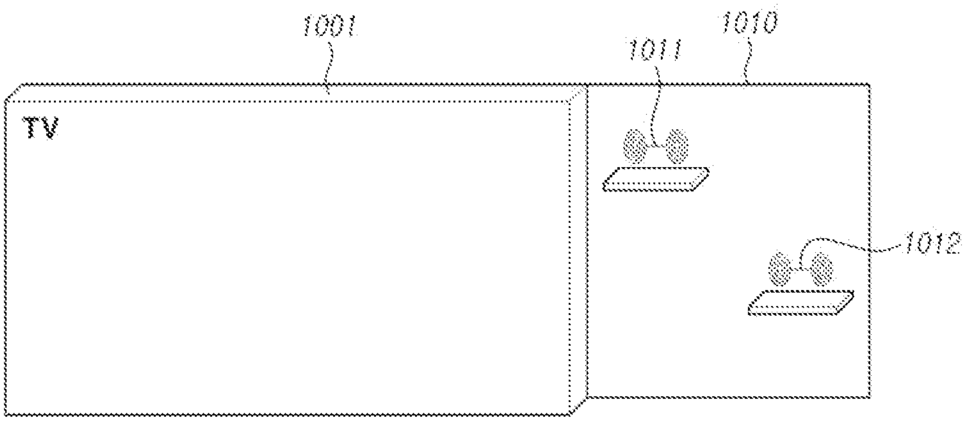
FIG. 10 illustrates an example electronic device including a rectifier circuit according to an embodiment.

FIG. 8 illustrates an example electronic device including a rectifier circuit according to an embodiment. FIG. 9 illustrates an example electronic device including a rectifier circuit according to an embodiment. FIG. 10 illustrates an example electronic device including a rectifier circuit according to an embodiment. FIG. 8 illustrates an example of wireless power transmission between a TV and a sound bar. FIG. 9 illustrates an example of wireless power transmission between a TV and a plurality of sound bars. FIG. 10 illustrates an example of wireless power transmission applied to a TV accessory.

Referring to FIG. 8, a TV 810 may include a plurality of transmission coils 811. A sound bar 820 may include a plurality of reception coils 821. The plurality of transmission coils 811 may be coils corresponding to the first transmission coil 611 and second transmission coil 612 illustrated in FIG. 6, and the plurality of reception coils 821 may be coils corresponding to the first reception coil 621 and the second reception coil 624 illustrated in FIG. 6.

According to an embodiment, the plurality of transmission coils 811 and the plurality of reception coils 821 may be disposed on the surfaces, of faces of the respective devices facing each other, and may be coupled to each other.

According to an embodiment, the plurality of transmission coils 811 may receive power through an external power source and transfer the power to the plurality of reception coils 821.

Referring to FIG. 9, a TV 910 may include a plurality of transmission coils 911 and a plurality of transmission coils 912. A sound bar 920 may include a plurality of reception coils 921. A sound bar 930 may include a plurality of reception coils 931. The plurality of transmission coils 911 and the plurality of transmission coils 912 may be coils corresponding to the first transmission coil 611 and the second transmission coil 612 illustrated in FIG. 6, and the plurality of reception coils 921 and the plurality of reception coils 931 may be coils corresponding to the first reception coils 621 and second reception coil 624 illustrated in FIG. 6.

According to an embodiment, the plurality of transmission coils 911 and the plurality of reception coils 931 may be disposed on surfaces, of faces of the respective devices facing each other, and may be coupled to each other.

According to an embodiment, the plurality of transmission coils 912 and the plurality of reception coils 921 may be disposed on surfaces, of faces of the respective devices facing each other, and may be coupled to each other.

Accordingly, power may be wirelessly supplied from one TV device to the plurality of sound bars.

Referring to FIG. 10, a TV accessory 1010 (e.g., a shelf) disposed adjacent to a TV 1001 may include a plurality of transmission coils 1011 and 1012. The plurality of transmission coils 1011 and 1012 may be coils corresponding to the first transmission coil 611 and second transmission coil 612 illustrated in FIG. 6. It may be applied to a shelf-type accessory coupled with the TV, performing wireless charging on the electronic device placed on the shelf.

The center-tapped rectifier structure-based wireless power transmission circuit described in connection with FIG. 1, FIG. 2, FIG. 3A, FIG. 3B, FIG. 3C, FIG. 4, FIG. 5, FIG. 6, FIG. 7, FIG. 8, FIG. 9, and FIG. 10 may minimize the difference in leakage inductance between the reception-side coils that the center-tapped rectifier structure may have. Accordingly, the currents flowing through the diodes included in the receiving terminal may be matched to be similar to each other. As compared with the conventional full-bridge structure rectifier, it is possible to save costs by reducing the number of rectifier diodes by half and to increase efficiency by reducing loss in the rectifier diodes. It is also possible to increase the number of transmission coil turns while minimizing the area and height of the transmission coil by the structure in which the coils of the transmitting end are divided in two which are connected in series, and reception coils respectively corresponding to the transmission coils are disposed.

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". Apart or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a rectifier circuit comprising:

a first reception coil;

a second reception coil disposed inside the first reception coil;

a first diode connected in parallel with the first reception coil, wherein a first end of the first reception coil is directly connected to an input end of the first diode, and a second end of the first reception coil is directly connected to an output end of the first diode; and a second diode connected in parallel with the second reception coil, wherein a first end of the second reception coil is directly connected to an input end of the second diode, and a second end of the second reception coil is directly connected to an output end of the second diode; and a first capacitor, wherein the input end of the first diode is connected to the output end of the second diode directly through the first capacitor.

2. The electronic device of claim 1, wherein the first reception coil and the second reception coil are disposed on a first plane and spaced apart from each other by a first distance, and wherein the first reception coil and the second reception coil are connected in parallel.

3. The electronic device of claim 2, further comprising:

a first transmission coil; and a second transmission coil connected in series with the first transmission coil, wherein the first transmission coil is coupled to the first reception coil, and the second transmission coil is coupled to the second reception coil.

4. The electronic device of claim 3, wherein the first transmission coil and the second transmission coil are disposed on a second plane, and wherein the first transmission coil and the second transmission coil are spaced apart by a second distance.

5. The electronic device of claim 4, wherein the rectifier circuit further comprises:

a third reception coil; and a fourth reception coil, wherein the third reception coil and the fourth reception coil are disposed on the first plane, wherein the third reception coil is spaced apart from the first reception coil by a third distance, wherein the fourth reception coil is spaced apart from the second reception coil by the third distance, and wherein the first reception coil, the second reception coil, the third reception coil, and the fourth reception coil are connected in parallel.

6. The electronic device of claim 5, wherein the rectifier circuit further comprises:

a second capacitor;

a third diode, a first end of the third reception coil is connected to an input end of the third diode, and a second end of the third reception coil is connected to an output end of the third diode; and a fourth diode, a first end of the fourth reception coil is connected to an input end of the fourth diode, and a second end of the fourth reception coil is connected to an output end of the fourth diode, and wherein the input end of the third diode is connected to the output end of the fourth diode through the second capacitor.

7. The electronic device of claim 6, further comprising:

a third transmission coil; and a fourth transmission coil connected in series with the third transmission coil, wherein the third transmission coil is coupled to the third reception coil, and wherein the fourth transmission coil is coupled to the fourth reception coil.

8. The electronic device of claim 7, wherein the third transmission coil and the fourth transmission coil are disposed on the second plane, wherein the third transmission coil is spaced apart from the first transmission coil by a fourth distance, wherein the fourth transmission coil is spaced apart from the second transmission coil by the fourth distance, and wherein the first transmission coil, the second transmission coil, the third transmission coil, and the fourth transmission coil are connected in series.

9. The electronic device of claim 7, wherein the first transmission coil is connected to an external power source configured to supply power to the electronic device.

10. The electronic device of claim 9, further comprising:

a third capacitor connected to the first transmission coil; and a first switch and a second switch connected in parallel to the third capacitor and the first reception coil.

11. The electronic device of claim 4, wherein the first plane is spaced apart from the second plane by a fifth distance, and wherein the first plane is disposed in parallel to the second plane.

12. The electronic device of claim 3, wherein each of the first reception coil and the second reception coil is circular.

13. The electronic device of claim 12, wherein each of the first transmission coil and the second transmission coil is circular.

14. The electronic device of claim 1, further comprising a battery, wherein the rectifier circuit is connected to the battery.

15. The electronic device of claim 1, wherein the first reception coil is disposed in parallel to the second reception coil, and wherein the first reception coil and the second reception coil are disposed on different planes, respectively.

16. The electronic device of claim 1, wherein the second reception coil is arranged in a center area of the first reception coil, and wherein the first reception coil and the second reception coil are arranged on a first plane.

17. The electronic device of claim 1, wherein the first reception coil and the second reception coil have a same number of turns.

18. The electronic device of claim 1, further comprising a single transmission coil coupled with each of the first reception coil and the second reception coil.

19. The electronic device of claim 1, wherein the input end of the first diode, the first end of the first reception coil, and a first end of the first capacitor are directly connected to each other.

20. The electronic device of claim 1, wherein the output end of the second diode, the second end of the second reception coil, and a second end of the first capacitor are directly connected to each other.

* * * * *